United States Patent [19]  [11] 3,884,454
Passmore  [45] May 20, 1975

[54] AIR SPRING SYSTEM AND DAMPED AIR VALVE THEREFOR

[75] Inventor: David G. Passmore, Sparta, Mich.
[73] Assignee: Lear Siegler, Inc., Santa Monica, Calif.
[22] Filed: Oct. 29, 1973
[21] Appl. No.: 410,466

[52] U.S. Cl............................ 263/65 D; 137/677.5
[51] Int. Cl.............................................. F16f 5/00
[58] Field of Search............. 267/65 D; 280/124 F; 137/627.5, 596, 596.2

[56] References Cited
UNITED STATES PATENTS

| | | | |
|---|---|---|---|
| 2,938,719 | 5/1960 | Broadwell | 267/65 D |
| 2,977,110 | 3/1961 | Kilgore | 267/65 D |
| 3,082,018 | 3/1963 | Smirl | 137/627.5 |
| 3,635,460 | 1/1972 | Shilton | 267/65 D |

Primary Examiner—James B. Marbert
Attorney, Agent, or Firm—McGarry & Waters

[57] ABSTRACT

A system for controlling the height of a vehicle with respect to an axle and an air valve therefor wherein the air spring supports the vehicle on an axle and a damped air valve controls the flow of air to the air spring. The air valve is of the vane damping type and has by-pass conduits which extend from opposite side walls of the damping chamber to the central portion of the end wall of the damping cavity. Check valves are provided in the by-pass conduits to prevent the flow of fluid through the by-pass conduits from the side walls to the end walls, but to permit the flow of fluid in an opposite direction so that the vanes are damped in their movement away from a central position, yet freely return from the side walls to the central position. As the vane approaches the central position, it blocks the passage of fluid through the by-pass cavity, thereby damping the movement of the vane as the vane approaches the central position. The damping chamber desirably includes upper and lower portions symmetrical about the actuator shaft and the vane extends into both portions of the cavity. Reservoir cavities are provided also above and below the lower portions respectively of the damping chamber so that the valve can be used on either side of the vehicle with the position of the valve on one side inverted with respect to the position on the other side.

10 Claims, 5 Drawing Figures

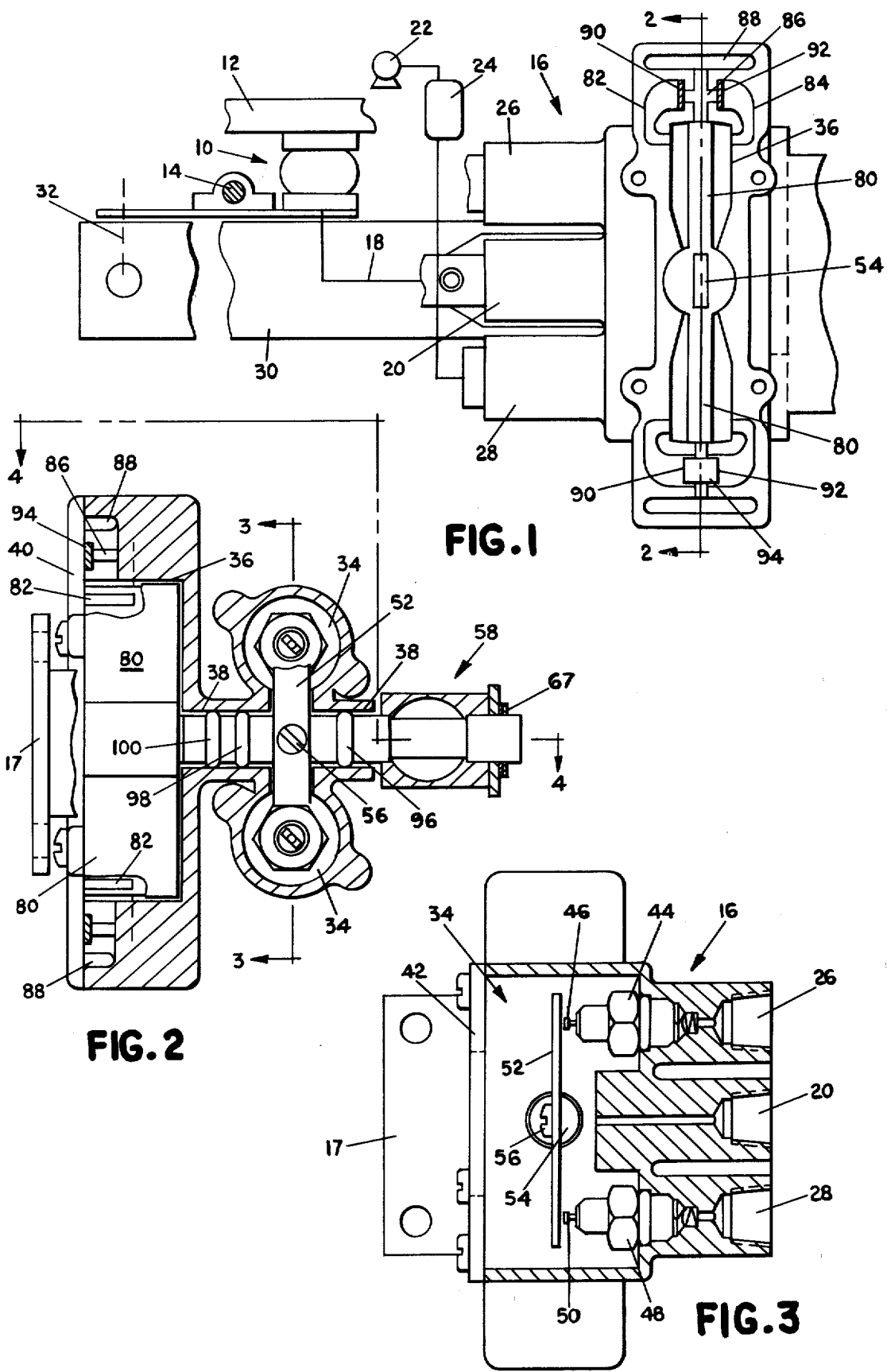

AIR SPRING SYSTEM AND DAMPED AIR VALVE THEREFOR

BACKGROUND OF THE INVENTION

1. Field of the Invention

This invention relates to air spring systems for vehicles and to damped air valves therefor. In one of its aspects, the invention relates to a damped air valve having a damping chamber in which the movement of actuating members are damped from a neutral position but are undamped in return movement to the neutral position, except just before the exact neutral position is reached. In another of its aspects, the invention relates to a damping air valve for vehicles wherein the valve is symmetrical about a horizontal axis so that it can be used interchangeably with either end up on opposite sides of the vehicle.

2. State of the Prior Art

Air suspension systems for vehicles are well-known and have been used extensively in automobiles as well as commercial vehicles. Such valves are disclosed, for example, in United Kingdom Pat. No. 444,540 to Faudi, and in the U.S. Pats. to Christensen No. 2,970,614; Jackson et al. No. 3,060,963; Smirl No. 3,082,018; Smirl No. 3,162,433; Backlund No. 3,181,854; Kurichh No. 3,508,585; Denny No. 3,563,270; and Okuyama No. 3,659,870. In all such systems, a leveling valve controls the pressure in the air spring responsive to changes in load as reflected by the level of the vehicle with respect to the axle. However, the level oscillates as the spring responds to road contours. The valve operation must thus be damped so that the valve does not respond to oscillatory changes in level.

In most valves, the air is supplied to the air spring through an air cavity in the damping valve and the air supply conduit is provided with a normally closed valve. Operation of the valve in the air supply conduit admits more air to the air spring. In like manner, air is exhausted from the air spring through a valved conduit.

In the system of Backlund, for example, a torque is applied to an actuating shaft which mounts an air valve actuator in an air chamber and a damping vane in a fluid filled damping cylinder. Rotation of the actuating shaft in one direction will open the air supply valve to inflate the air spring and rotation of the actuator shaft in the opposite direction will open the exhaust valve to deflate the air spring. The damping vane is considerably smaller than the damping chamber but has auxiliary vanes on either side thereof which are biased in contact with the vane to restrain the movement of the vane away from the neutral or central position. The auxiliary vanes have holes which permit the vanes to return relatively undamped to the central position. The auxiliary vanes are prevented from moving past the central point to the opposite side of the damping chamber.

Such systems, while preventing the relative free movement of the vanes back to a neutral position, do not apply any retarding force until the vanes have fully returned to the central position. Thus the vanes are subject to some hunting around the center point. Further, leakage of fluid may occur through the opening in the auxiliary vane so that the damping rates might vary from time to time and from side to side.

Other valves having similar vane type damping chambers are disclosed in the Patents to Smirl U.S. Pat. Nos. 3,082,018 and 3,162,433.

SUMMARY OF THE INVENTION

According to the invention, a damped air valve has a construction which allows the valve to be inverted for use on either side of the vehicle. Further, the valve provides a uniform damping rate for movement of an actuator shaft away from a neutral position and an undamped movement back to a position just short of the neutral or center position to avoid hunting around a center point.

The valve according to the invention has a sealed air chamber, a sealed, fluid filled damping chamber, valved conduits coupling the air spring with a source of air pressure and for exhausting air from the air spring, means for actuating the valves in the valved conduits responsive to changes in the height of the vehicle with respect to the axle. A common actuator shaft extends into both the air and damping chambers and means are provided for applying a torque to the actuator shaft. A vane in the damping cavity secured to the actuator shaft is mounted for movement between opposite side walls thereof with the dimensions of the vane approximating that of the damping cavity portion in which the vane moves to permit slow passage of the fluid around the vanes upon movement of the vanes within the cavity. By-pass conduits extend from opposite side walls of the damping chamber to a central portion of the end wall and a check valve is provided in the by-pass conduits to prevent the flow of fluid through the by-pass conduits from the side walls to the end walls, but permitting the flow of fluid in an opposite direction within the by-pass conduits. Thus, the vane is damped in its movement away from the center point, but is permitted free return toward the center point.

The by-pass conduit terminates at a central portion of the end wall and this by-pass conduit opening is blocked when the vane reaches a position just short of the center point. Thus, the flow of fluid through the by-pass conduit is also blocked when the vane approaches the center point. Thus, as the vane returns to the center point, it moves relatively undamped until it nears the center point and the movement thereafter is retarded to prevent hunting of the vane around the center point.

The damping chamber desirably includes upper and lower portions disposed symmetrically above and below the actuator shaft respectively and the vane extends into both portions of the cavity. By-pass conduits are provided in each end of the damping chamber so that the valve can be used in right-side-up or inverted positions. This permits the valve to be used on either side of the vehicle with the position on one side being inverted with respect to the position on the other side.

To assist in the use of the valve in either position, a reservoir cavity is provided above and below the upper and lower portions of the damping chamber. In the event that air bubbles are present in the damping fluid, the air bubbles will migrate to the reservoir cavity and will not affect the damping movement of the vane.

BRIEF DESCRIPTION OF THE DRAWINGS

The invention will now be described with reference to the accompanying drawings in which:

FIG. 1 is a schematic view of an air spring system including an end view of the valve according to the invention with an end plate thereof removed;

FIG. 2 is a sectional view taken along lines 2—2 of FIG. 1;

FIG. 3 is a sectional view taken along lines 3—3 of FIG. 2;

DESCRIPTION OF THE PREFERRED EMBODIMENT

Figure 4:
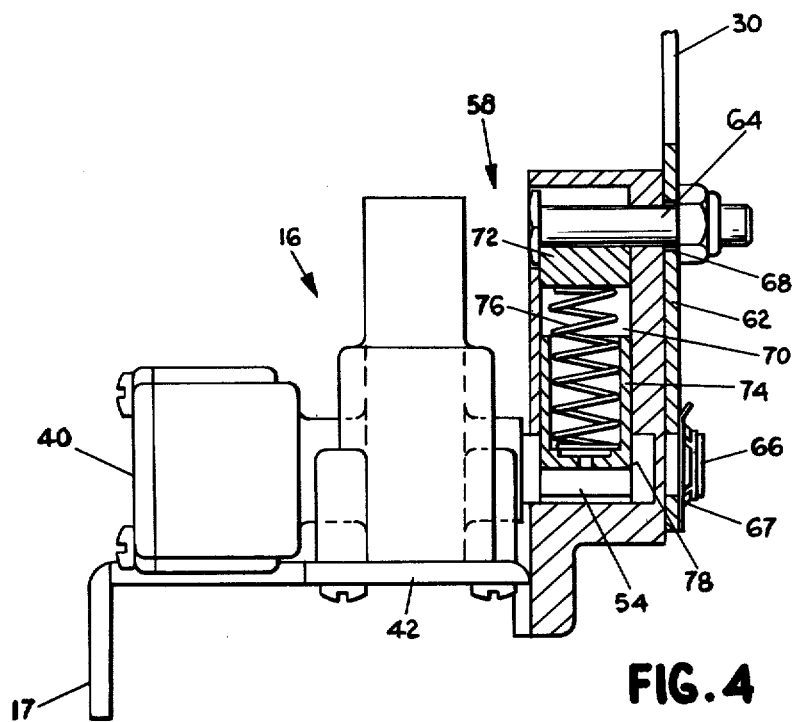
FIG. 4 is a view taken along lines 4—4 of FIG. 2.

Referring now to the drawings, and to FIG. 1 in particular, there is shown an air spring system for supporting a vehicle. The air spring 10 is mounted between a vehicle frame 12 and a vehicle axle 14 on a suspension system. A damped air valve 16 controls the flow of air to and from the air spring 10 through an open port 20 in the air valve and through an air line 18. A compressor 22 supplies air to an air tank 24 which in turn is connected through a suitable conduit to a valve inlet port 28 in the air valve 16. A valved exhaust port 26, similar in structure to the valve inlet port 28, is provided diametrically opposite the inlet port 26.

A lever 30 is mounted to the valve through a torque coupler for operating the air valve and, at its free outer end, is coupled through a connection 32 to the suspension system for the axle 14. The valve is mounted through means (not shown) to the vehicle frame 12.

Reference is now made to FIGS. 2 and 3 for a description of the air chamber in the air valve 16. A two lobe air chamber 34 and a damping chamber 36 are formed in the valve and are connected through a lateral bore 38. An end plate 42 is provided to seal the chamber 34 and an end plate 40 seals the damping chamber 36.

As illustrated in FIG. 3, the exhaust 26 has a valve 44 with a spring loaded release member 46 and the inlet port 28 has a valve 40 with spring release member 50. The valves 44 and 48 are normally closed and are opened to permit passage of air therethrough upon depression of release members 46 and 50 respectively.

A paddle 52 is secured to an actuator shaft 54 through a suitable screw 56. Rotation of the paddle 52 in a clockwise direction as in FIG. 3 will depress the release member 46 thereby exhausting air through the check valve 44. Rotation of the paddle 52 in counterclockwise direction as viewed in FIG. 3 will depress the release member 50 and admit air into the air chamber 34 through check valve 48. Since the port 20 is open to the air spring, opening of the valve 44 will result in decreasing the air pressure in the air spring 10 and opening of port 48 will cause an increase of air pressure in the air spring 10.

A bracket 17 is provided for securing the air valve 16 to the frame 12 to suitable means (not shown).

A torque is applied to the actuator shaft 54 through a torque mechanism 58 for rotation of the actuator shaft 54 responsive to changes in the vehicle load. Reference is now made to FIG. 4 for a description of the torque mechanism 58.

The torque mechanism 58 comprises a block 62 which is secured to the lever 30 through a bolt 64 and through a boss 66 on the valve housing. A retainer washer 67 desirably is provided in the boss 66 for retaining the lever 30 thereon. Preferably, the bolt 64 extends through a slot 68 in the lever 30 so that the lever 30 can be adjusted somewhat with respect to the block 62.

The block 62 has a chamber 70 with a spring 76 biased between a stop 72 and a piston 74. The lower end of the piston 74 abuts a flat surface 78 of the actuator shaft 54. The upper end of the stop 72 abuts the bolt 64.

In operation, as the lever 30 is pivotally moved with respect to the frame 12, the block 62 will rotate about the actuator shaft 54. As it rotates, the piston 74 will be moved upwardly with respect to the actuator shaft 54 due to the flat side 78 thereof. The pressure of the piston 74 against the side or edge of the flat side 78 will apply a torque to the actuator shaft 54 tending to rotate the shaft in the direction of the handle.

The rotation of the actuator shaft 54 is damped by means 80 in the damping chamber 36. Reference is now made to FIGS. 1 and 2 for a description of the damping chambers and the damping mechanism.

The damping chamber 36 is symmetrical about the horizontal plane through the actuator shaft 54. For purposes of brevity, only one such end will be described, it being understood that the other is identical in form and function.

The damping chamber 36 is normally filled with a viscous fluid such as a silicone fluid or a hydraulic fluid. At the end of the chamber 36 there are provided side ports 82 and 84 which connect at a central port. The central port is connected at an upper end to a reservoir 88 and to the damping chamber 36 at a lower end thereof. A flat check valve 90 is provided between the side port 82 and the central port 86. In a like manner, a flap or check valve 90 is provided between the side port 84 and the central port 86. The check valves 90 and 92 are actually part of a thin metal band bent in a U-shape having a bight portion 94 (FIG. 2) extending between the valve members 90 and 92. The valves 90 and 92 abut lands in the central port to seal the passageways between the side ports 82 and 84 and the central port 86. The check valve 90 thus prevents flow of fluid from the side port 82 and into the central port 86, but permits flow of fluid in the opposite direction. In a like manner, the check valve 92 prevents flow of fluid between the side port 84 and the central port 86, but permits the flow of fluid in the opposite direction.

O-rings 96 and 98 seal the two-lobe air chamber 34 at the bore 38. In like manner, O-ring 100 seals the fluid damping chamber 36 at the bore 38.

The operation of the damping valve will now be described with reference to FIGS. 1, 3 and 5. When the lever 30 applies a torque to the actuator shaft 54 through the torque mechanism 58 in a manner which has been described above, the torque will be transmitted to the vanes 80. Assuming that the torque is a counterclockwise torque as viewed in FIGS. 1 and 5, the vanes will attempt to move in a counterclockwise direction, but will but will be restrained from movement by the viscous fluid in the damping chamber 36. The flap or check valve 90 prevents the fluid from being pushed through the side port 82 through the central port 86 and through the side port 84 to the other side of the valve. The relationship between the vanes 80 and the chamber 36 is such that a small tolerance is provided between the two so that the fluid flows slowly around the vane from one side thereof to the other thus permitting the vanes to move slowly in a counterclockwise direction, assuming that the torque is maintained. If the torque is of short duration, obviously, the vanes will have very limited, if any, movement and the actuator shaft 54 will have a correspondingly small movement.

Figure 5:
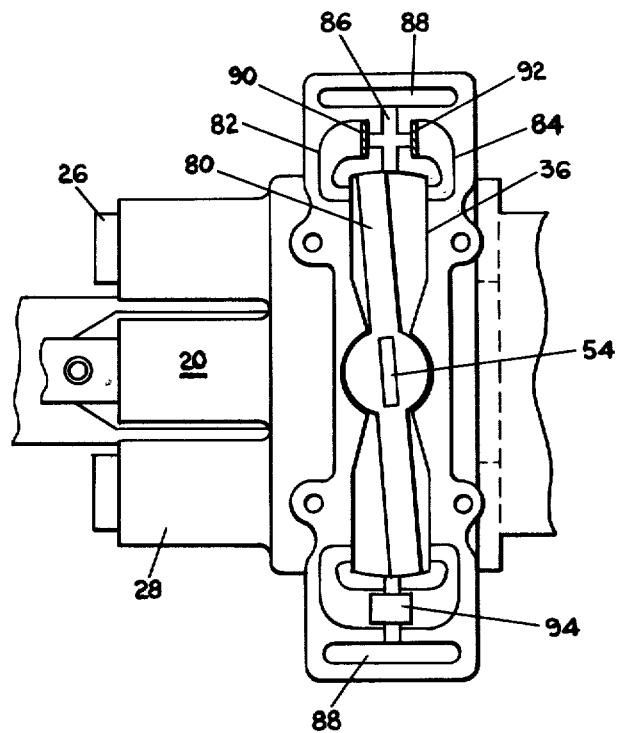
FIG. 5 is a partial view similar to FIG. 1 illustrating the valve in a different operative condition.

However, assuming that the torque continues, the vanes 80 will eventually move to the position illustrated in FIG. 5. As indicated above, the vane movement to this position is relatively slow as the damping fluid must move around the vanes as the vanes move in the counterclockwise direction. When the vanes are in this position, the shaft 54 will be rotated and will cause the paddle 52 to rotate in a clockwise direction as viewed in FIG. 3 (FIGS. 1 and 3 are views looking in opposite directions) so that the paddle 52 will depress the release member 46. Air will thus be exhausted from the airspring 10 until the lever 30 returns to a neutral position. Upon returning to the neutral position, the lever will apply an opposite torque to the actuator shaft 54. If the actuator shaft moves slowly back to the neutral position, the air is likely to be over exhausted to the airspring which would eventually cause an opposite reaction to increase the air to the airspring. Thus, the actuator shaft is required to return quickly to its neutral position in order to prevent hunting around the neutral position. The novel structure of the valve permits the actuator shaft 54 to move very quickly back to the neutral position. As seen in FIG. 5, when a clockwise torque is applied to the vanes 80, the fluid can flow from the right side of the upper vane through the central port 86, past the check valve 90, through the side port 82 to the other side of the vane 80. Thus, the vane quickly moves back to a neutral position.

It should be noted that the vanes 80 will move quickly to a point just short of the neutral center, i.e., the point at which the passage between the damping chamber 36 and the central port 86 is blocked. However, at this point, the paddle 52 will have disengaged the release member 46 so that the admission of air through the valve 46 will have ceased. The vanes will then continue to move to the true neutral point, but at a very slow pace to prevent hunting of the vanes around the neutral center point. In other words, a rapid movement of the vanes to the exact center point would result in a slight hunting of the vanes around the center point due to inertia of the vanes.

The operation of the valve has been described with respect to rotation of the actuator shaft in a counterclockwise direction as viewed in FIGS. 1 and 5. However, it is obvious that the valve would operate in a like manner (except for depressing the release member 50) upon rotation of the actuator shaft in a clockwise direction (as viewed in FIGS. 1 and 5), and an opposite result would occur in the air spring 10.

The damping valve according to the invention provides an effective damping of the air valve and which further prevents hunting of the damping means around a neutral point.

The valve described above can be used interchangeably on either side of the vehicle. For example, the system described above would be used, for example, on the left side of the vehicle (facing the front of the vehicle from the rear). In order to use the valve on the opposite side of a vehicle, the valve is inverted and then secured directly to the left side of the vehicle. In the inverted position, the valve outlet port 26 would become the inlet and the valve inlet port 28 would become the valve outlet port. However, the physical location of the inlet and outlet ports remain the same on both sides of the valve. In other words, the connection to the air pressure supply means remains at the bottom of the valve and the exhaust port remains at the top of the valve regardless of which side of the vehicle on which the valve is used. Further, in the inverted position, the lever will always be in position ready for use and need not be further adjusted. In other words, the valve needs no adjustment to be mounted on the right or left side of the vehicle. Other types of valves which need to be rotated about a vertical axis for use on the other side of the vehicle require other modifications to adapt the valves for use on opposite sides of vehicles.

Reasonable variation and modification are possible within the scope of the foregoing disclosure, drawings, and the appended claims without departing from the spirit of the invention.

The embodiments of the invention in which an exclusive property or privilege is claimed are defined as follows:

1. In a system for controlling the height of a vehicle with respect to an axle wherein an air spring supports the vehicle on an axle and an air valve controls the flow of air to the air spring and wherein the air valve comprises:

a valve body having a sealed air chamber, and a sealed fluid filled damping chamber including opposite side walls and an end wall;

valved conduits in said valve body coupling said air spring with a source of air pressure and coupling said air spring with the atmosphere for exhausting air from said air spring;

means for actuating the valves in the valved conduit responsive to changes in the height of the said vehicle with respect to said axle, said control means including a common actuator shaft in said air and damping chambers and means for applying a torque to said shaft;

means in said damping chamber to damp the movement of said shaft, said damping means including at least one vane in said damping cavity, said vane being mounted in the said damping cavity for movement between opposite side walls thereof with the dimensions of said vane approximating that of said damping cavity portion in which said vane moves to permit slow passage of fluid around said vanes upon movement of said vanes within said cavity;

the improvement which comprises:

by-pass conduits extending from said opposite side walls of said damping chamber to a central portion of said end wall; and check valve means in said by-pass conduits to prevent the flow of fluid through said by-pass conduits from said side walls to said end walls, but to permit the flow of fluid in an opposite direction in said by-pass conduit, whereby said vane is damped in the movement thereof from a central position to either of said side walls, but is undamped in return movement to the central position.

2. A system according to claim 1 wherein said valved conduits include a first conduit above said actuator shaft and extending from a side of said valve body and a second conduit below said actuator shaft and extending from said side of said valve body; and said actuating means includes a paddle secured to said shaft for alternately operating valves in said first and second conduits, whereby the valves can be used on either side of said vehicle by inverting said valve body and the appearance and configuration of said valve on either side of said vehicle is the same.

3. A system according to claim 2 wherein said damping chamber includes upper and lower portions disposed above and below said actuator shaft respectively and wherein said vane extends into both portions of said cavity.

4. A system according to claim 3 and further comprising a reservoir cavity above said upper portion of said damping chamber and a reservoir cavity below said lower portion of said damping cavity to eliminate air bubbles from said damping cavity regardless of whether said damping chamber is right side up or inverted.

5. A system according to claim 4 wherein said reservoir cavities are connected to said by-pass conduits in the respective upper and lower portions of said damping chamber.

6. The system according to claim 1 wherein said damping chamber includes upper and lower portions disposed above and below said actuator shaft respectively and wherein said vanes extend into both portions of said cavity.

7. A system according to claim 6 and further comprising a reservoir cavity above said upper portion of said damping chamber and a reservoir cavity below said lower portion of said damping chamber to eliminate air bubbles from said damping chamber regardless of the orientation thereof.

8. In an air control valve for operating an air spring responsive to changes in the load on said air spring, said valve having a body with a sealed air chamber and a sealed, fluid filled damping chamber, valved conduits in said air chamber for coupling said air spring to a source of air pressure and to exhaust air from said air spring, means for actuating the valve in said valved conduit to control the flow of air through said air chamber, said control means including a common actuator shaft in said air and damping chambers, a vane secured non-rotatably to said actuator shaft in said damping chamber for movement between opposite sides thereof to damp the movement of said shaft, the improvement which comprises:

a by-pass conduit in the wall of said damping cavity extending from one side of said damping cavity to the other, said by-pass conduit including a port communicating with a portion of said damping cavity intermediate the sides thereof; and check valve means in said by-pass conduit to permit fluid flow from said port through said by-pass conduit to either side of said damping cavity, but to prevent fluid flow from the sides of said damping cavity through said by-pass conduit to said port.

9. An air control valve according to claim 8 wherein said damping cavity has portions extending above and below said shaft, said vane extends equally into both portions of said damping cavity, said air chamber has portions above and below said actuator shaft and said valved conduits extend from a common side of said air chamber with one valve cavity above said actuator shaft and another valve cavity extending from below said valved conduit, and wherein said control means includes an element secured to said actuator shaft and extending above and below said actuator shaft to operate one of said valves in said valved conduits upon rotation of said actuator shaft.

10. An air control valve according to claim 9 and further comprising an open port through said body in said air cavity intermediate said valved conduits for coupling said air cavity to said air spring.

* * * * *